UNITED STATES PATENT OFFICE.

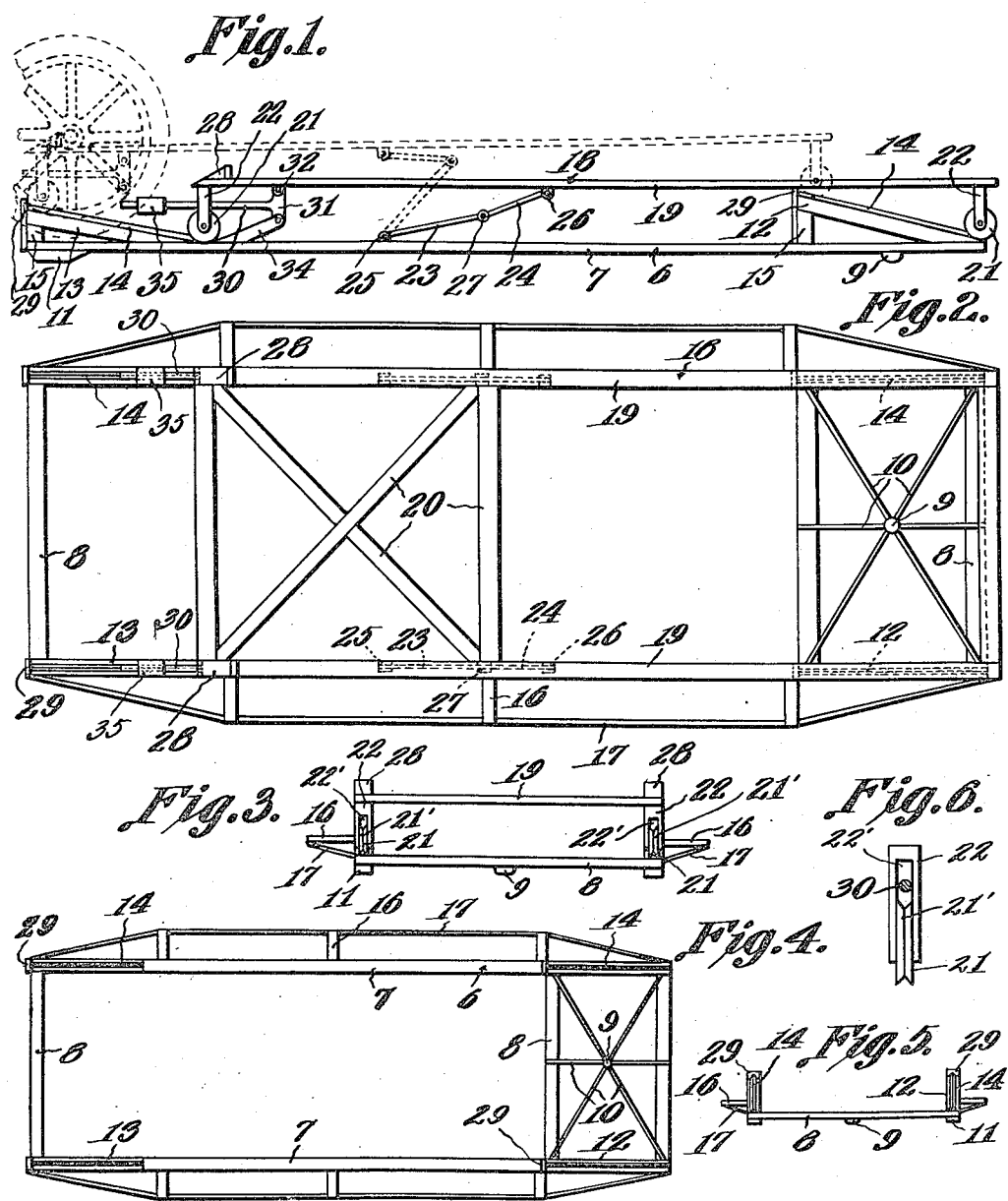

ARBANNAS S. ALBRIGHT, OF GAINESVILLE, FLORIDA.

AUTOMOBILE-JACK.

1,142,655.     Specification of Letters Patent.     Patented June 8, 1915.

Application filed April 13, 1914. Serial No. 831,606.

*To all whom it may concern:*

Be it known that I, ARBANNAS S. ALBRIGHT, a citizen of the United States, residing at Gainesville, in the county of Alachua and State of Florida, have invented a new and useful Automobile-Jack, of which the following is a specification.

This invention relates to improvements in automobile jacks and more particularly to that class in which the momentum of the car is utilized to raise the wheels clear of the ground.

One object of the present invention is to provide an improved structure such that the forward momentum of the car will be utilized in raising the same above the ground, thus bringing the car to a gradual stop and eliminating jarring and jolting.

A further object is to provide the combination with a trunk or carriage mounted upon inclines carried by a frame so that the forward momentum of the automobile onto the carriage moves a carriage up the inclines of novel means for automatically locking or braking the carriage whereby it will be prevented from retrograde movement until released by the operator.

A further object is to provide the combination with the carriage mounted upon the inclines, of novel means for limiting the movement of the carriage.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a side elevation of the improved automobile jack and representing by dotted lines, the raised position thereof. Fig. 2 is a top plan view of the same. Fig. 3 is a reduced front view. Fig. 4 is a reduced plan view of the base frame. Fig. 5 is a reduced front view of the base frame. Fig. 6 is an enlarged detail view of one of the wheel supports and illustrating the brake lever passing through the arms of the support.

Referring to the drawings in which similar reference numerals designate corresponding parts throughout the several views, a base frame 6 including longitudinal side beams 7 and cross struts 8, is pivotally secured at its rear end by means of a pivot or allied anchoring device 9, to the floor of a garage or other foundation where vehicles are to be stored.

The anchoring pivot 9 is located between the beams 7, and is held in place by braces 10. The front end of the base frame is provided with blocks 11, allowing for the frame to adjust itself to the automobile or vehicle as it passes there-over. In this connection it is to be noted that longitudinal tie rods 17 extending over to the outstanding arms 16 of the beams 7 and terminally connected to the beams, in addition to bracing the beams, afford guiding means against which the vehicle wheels contact, to force the jack into proper alinement with the vehicle for its subsequent elevation. The tie rods 17 converge at their front and rear extremities and are connected in any suitable manner to the front and rear extremities of the longitudinal beams 7.

The beams 7 of the base frame are provided with front and rear inclines 12 and 13, each of which is composed of a rail 14 with a V-shaped upper edge which is supported in its angular position by an upright or post 15. The angularity of the rails is such that the forward momentum of the vehicle will be totally expended prior to reaching the extreme height at the upper extremities of the inclines, thus resulting in the gradual stopping of the automobile or vehicle during the period it is being raised.

Coöperating with the base frame and inclines is the carriage or truck 18 which similar to the base frame, is composed of the longitudinal side beams 19 and cross braces 20. The braces and beams are of sufficient size to lend the requisite strength and rigidity to the carriage. The carriage is movably supported upon the inclines by the wheels 21 which are provided with the notched peripheries 21′ engaging with the upper edges of the rails 14. The wheels are journaled within the supports 22, having bifurcations 22' receiving the wheels. The supports are positioned beneath and attached to the carriage.

In order to eliminate, to as great a degree as possible, side vibration and sideswipe due to the automobile contacting with the carriage in other than an axial or medial manner and to limit the reciprocating movement of the carriage, a pair of links 23 and 24 are provided at each side and have their adjacent ends pivoted together, as at 27, and their remote ends pivoted as at 25 and 26, respectively, to the beams 6 and 19. The links are so designed as not to interfere with the normal forward or return motion of the carriage but will hold the same against derailment, it being noted, furthermore, that when the carriage is moved to its lowermost position as illustrated in full lines, in Fig. 1, the links 23 and 24 will be straightened out to eliminate the movement of the carriage rearwardly, and when the carriage is moved upwardly to the dotted line position illustrated in Fig. 1, the upper links 24 and the upper ends of the lower links 23 will swing against the beams 19 of the carriage 18 to assist in limiting the upward or forward movement of the carriage. In this connection it is to be also noted that the configuration of the tracks and wheels is such as to prevent derailment and thus provides for the proper working of the device.

In order that the automobile will contact with the carriage 19 when run thereonto upstanding abutments 28 are secured upon the front ends of the beams 19 to contact with the front axle of the automobile which thus moves the carriage forwardly until such time as the carriage is raised against the axles of the vehicle.

As has been explained, the momentum of the car in ordinary cases is not sufficient to carry the carriage to its extreme upper position, but to prevent the possibility of the carriage running beyond the extremities of the inclines, the stops 29 are provided at the upper ends of the inclines 13.

In order that the carriage will be locked at intermediate position upon the inclines, a lever 30 is at each side and has a T-head 31 pivotally connected at one end, as at 32, to the beam 19 of the carriage and a brake shoe 34 is pivotally connected to the other or lower end of the T-head 31. The brake shoes 34 extend partially under or adjacent to the wheels 21 and slide upon the rails 14 so that as the carriage is carried forward, the brake shoes 34 will not interfere with the free motion thereof. However, when the forward momentum of the vehicle has been spent in the upward raising thereof, the carriage and automobile or vehicle will tend to gravitate to the lower position and this is checked and prevented by the front wheels 21 frictionally engaging the brake shoes 34, the brake shoes wedging between the front wheels and inclines so as to prevent the retrograde motion of the carriage. The levers 30 project through the front supports 22 and are provided with pedals 35 which may be depressed by the foot, resulting in the withdrawal and rearward displacement of the brake shoes 34, carrying them out of wedged contact with the rails and wheels and allowing the carriage to freely gravitate to its lowermost and rearmost position and returning the automobile or vehicle to its lowered position upon the ground.

The many advantages inherent with such structures it is thought will be readily appreciated, among which may be mentioned the fact that the abrupt shock and jar incident to the reaching of the vehicle and carriage to the uppermost position is entirely eliminated in the present device. The normal forward momentum of the vehicle is sufficient to carry the carriage to an intermediate position upon the inclines, to raise the tires above the ground, and to thus relieve the tires when idle. The braking mechanism will then immediately act and hold the carriage in such position. Mention is made of the fact that by moving the brake levers downwardly, the brake shoes will be released from the wheels and rails, allowing the carriage to move rearwardly. However, a further depression of the brake levers results in their contact with the peripheries or upper portions of the respective wheels 21 and exerts a modified braking action thereon to retard the return of the carriage.

Having thus fully described my invention, what is claimed is:—

1. In an apparatus of the character described, an incline, a carriage having a wheel mounted upon the said incline, a lever pivoted to the carriage, a brake shoe pivoted to the lever and arranged to wedge between the said wheel and incline, the said lever being arranged to be swung so as to release the brake shoe and then swung against the said wheel.

2. In an apparatus of the character described, an incline, a carriage having a wheel mounted upon the incline, a lever having a T-head having its upper end pivoted to the carriage, and a brake shoe pivoted to the lower end of the T-head and arranged to wedge between the wheel and incline for holding the carriage against downward movement.

3. In an apparatus of the character described, an incline, a carriage having a wheel mounted upon the incline, a lever having a T-head having its upper end pivoted to the carriage, and a brake shoe pivoted to the lower end of the T-head and arranged to wedge between the wheel and incline for holding the carriage against downward movement, the said lever projecting in such a direction, as to bear upon the said wheel when the lever is swung to release the brake shoe.

In testimony that I claim the foregoing as my own, I have hereto affixed my signature in the presence of two witnesses.

ARBANNAS S. ALBRIGHT.

Witnesses:
J. B. DOUGLAS,
F. H. BOYNTON.